R. A. FESSENDEN.
RECEIVER FOR ELECTROMAGNETIC WAVES.
APPLICATION FILED APR. 25, 1906.

921,531.

Patented May 11, 1909.

UNITED STATES PATENT OFFICE.

REGINALD A. FESSENDEN, OF WASHINGTON, DISTRICT OF COLUMBIA.

RECEIVER FOR ELECTROMAGNETIC WAVES.

No. 921,531.　　　Specification of Letters Patent.　　　Patented May 11, 1909.

Application filed April 25, 1906. Serial No. 313,673.

*To all whom it may concern:*

Be it known that I, REGINALD A. FESSENDEN, a citizen of the United States, and resident of Washington, District of Columbia, have invented certain new and useful Improvements in Receivers for Electromagnetic Waves, of which the following is a specification.

The invention described herein relates to receivers for electro-magnetic waves, and has for its object a construction wherein the pressure of an electrode in contact with an electrolyte, on the electrolyte can be varied and thereby produce a signal or indication.

The invention is hereinafter more fully described and claimed.

Figure 1:
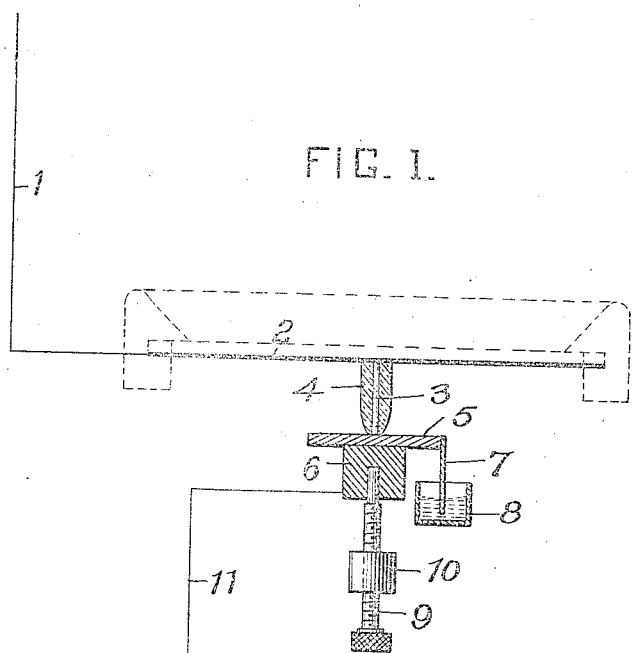
Figure 2:
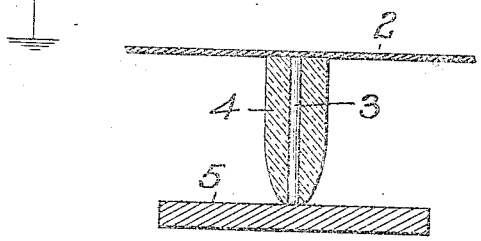

In the accompanying drawing forming a part of this specification, Figure 1 is a diagrammatic view illustrating my improvement and Fig. 2 is an enlarged view of the same.

In the practice of my invention the aerial, 1, is connected either directly or inductively to a diaphragm, 2, which may be the diaphragm of a telephone. A wire, 3, which may be formed of platinum, irridium, palladium or other suitable metal, is secured to the diaphragm, 2. The wire is preferably sealed in glass as shown and the ends of wire and sheath, 4, where they are in contact with or bear upon the electrolyte are preferably ground flat and flush one with the other. The electrode may be formed of platinum having the end in contact with the electrolyte covered with platinum black. The free end of the electrode bears as stated on an electrolyte which is supported in such manner as to form a resistance or abutment in order that motion may be imparted to the diaphragm on the receipt of impulses. In the construction shown the electrolyte is carried by an absorbent material, 5, supported in adjustable relation to the electrode by a block 6. The absorbent material, 5, which may be paper, leather, cloth, chalk, bicromated gelatin, wood, etc., is kept saturated with the electrolyte in any suitable manner, as for example by having a portion, as 7, dipping into a vessel, 8, containing the electrolyte. Glycerin may be mixed with the electrolyte, if it does not produce a chemical effect, in order to prevent evaporation. The block or support, 6, may be shifted to regulate the pressure of the electrode on the electrolyte by any suitable means as a screw, 9, passing through a fixed support, 10, and connected to the block as shown. The electrolyte is connected to ground by a wire, 11, preferably attached to the block, 6, which in such case is formed of a conducting material as copper, zinc, etc.

When the absorbent material is formed of wood, the grain is preferably parallel with the electrode.

When using the receiver the block is empirically adjusted by the screw until the electrode has such pressure on the absorbent material as to render the receiver most sensitive. On the receipt of waves, the electric oscillations flow from the aerial to ground through the electrode and electrolyte causing a variation in the pressure of the electrode and the absorbent material, causing the diaphragm, 2, to move, thereby producing a signal or indication directly or indirectly as by changing a secondary circuit, or an audible or visual signal.

While I have shown and described my preferred form of receiver, various changes as regards material or construction will readily suggest themselves to those skilled in the art, and hence as regards the terms of the broad claims, the invention is not limited to the specific materials, constructions or arrangements shown and described, as I consider any means whereby a signal or indication is produced by causing the pressure of an electrode on an electrolyte to be varied by electric oscillations traversing such electrode and electrolyte, to be within the spirit of my invention.

I claim herein as my invention:

1. A receiver having in combination an electrolyte and an electrode in contact therewith, means for maintaining yielding pressure between said parts whereby the pressure of one on the other is varied by the flow of electric oscillations and the resulting motion gives a signal.

2. A receiver having in combination an electrolyte and a small electrode in contact with the electrolyte, means for maintaining yielding pressure between them and means whereby varying the pressure on the electrolyte by received oscillations produces a signal.

3. A receiver having in combination a small electrode, an absorbent material in contact with the electrode resiliently under pressure and means for charging the absorbent material with an electrolyte.

4. A receiver having in combination a small electrode, an absorbent material charged with an electrolyte in contact with the electrode resiliently under pressure, and means for adjusting one of said parts relative to the other to vary the pressure.

5. A receiver having in combination a diaphragm, a small electrode connected to the diaphragm, an electrolyte in contact with the electrode, said parts being so arranged that the pressure of the electrolyte on the electrode is varied by received oscillations and motion is imparted to the diaphragm.

6. A receiver for electro-magnetic waves comprising an electrode, a medium containing an electrolyte and having a resistance, and means for maintaining a yielding pressure between said medium and electrode.

7. A receiver for electro-magnetic waves comprising a resisting medium containing an electrolyte, and an electrode held in contact therewith under a yielding pressure.

8. A receiver for electro-magnetic waves comprising a medium capable of resisting pressure and containing an electrolyte, a movable electrode in contact with the electrolyte under pressure, and a sound diaphragm connected to the electrode, substantially as and for the purpose described.

9. A receiver for signaling comprising a stationary body of fluid, and an indicating device mechanically connected to said fluid under pressure, so that the indicating device is moved by change of the pressure of the fluid against the electrode caused by electrical impulses received.

10. A receiver comprising a fluid, a terminal in contact with the fluid so as to be mechanically moved by change of pressure of the contact caused by electrical impulses, and an indicating device connected to said terminal.

11. A receiver comprising a stationary body of electrolyte, an electrode in contact therewith under resilient pressure, and an indicating device connected to the electrode and adapted to be moved by change of volume of the electrolyte, substantially as described.

In testimony whereof, I have hereunto set my hand and seal, the 18th day of April A. D. 1906.

REGINALD A. FESSENDEN. [L. S.]

Witnesses:
LEONARD MORGAN,
WILLIAM THELOGAN.